United States Patent Office.

EDWARD S. FRALEY, OF FOREST HILL, INDIANA.

WELDING COMPOUND.

SPECIFICATION forming part of Letters Patent No. 260,014, dated June 27, 1882.

Application filed October 1, 1881. (No specimens.)

*To all whom it may concern:*

Be it known that I, EDWARD S. FRALEY, a citizen of the United States, residing at Forest Hill, in the county of Decatur and State of Indiana, have invented a certain new and useful Compound called "Acma Welding Compound;" and I do hereby declare the following to be a full, clear, and exact description of the invention, such as will enable others skilled in the art to which it appertains to make and use the same.

This invention relates to that class of compounds used in the process of welding metals; and it consists in a composition formed by mixing refined borax, steel and iron filings, sal-ammoniac, copperas, cyanide of potash, sulphate of manganese, alcohol, and water.

To prepare the composition, take one hundred pounds of refined borax and put it into a suitable vessel over a blast-fire, so that the heat may be regulated at will, and heat until reduced to what is called "glass borax," stirring in the meantime until it becomes thin and has the appearance of melted iron, when the heat should be increased a few degrees; then take twenty pounds of steel and iron filings, in equal parts, continuing to stir, and add gradually the filings until all is melted; then pour out onto a flat iron surface and let it cool; then pulverize to the condition of fine gunpowder. After this take ten pounds of refined borax, five pounds of sal-ammoniac, five pounds of copperas, one pound of cyanide of potash, and one pound of sulphate of manganese; pulverize and mix with one pint of alcohol and half a pint of water; put the whole in an iron vessel and boil on a slow fire until it becomes a thick paste; spread on a flat surface until it dries; then pulverize and mix this with that first described, and the compound is ready for use.

I claim—

A compound consisting of refined borax and iron and steel filings, in combination with sal-ammoniac, copperas, cyanide of potash, sulphate of manganese, alcohol, and water, substantially as and for the purposes specified.

In testimony whereof I affix my signature in presence of two witnesses.

EDWARD S. FRALEY.

Witnesses:
 A. MILLER,
 ANDREW MILLER.